Oct. 25, 1927.  E. A. NELSON  1,646,867
VEHICLE WHEEL
Filed Dec. 6, 1923
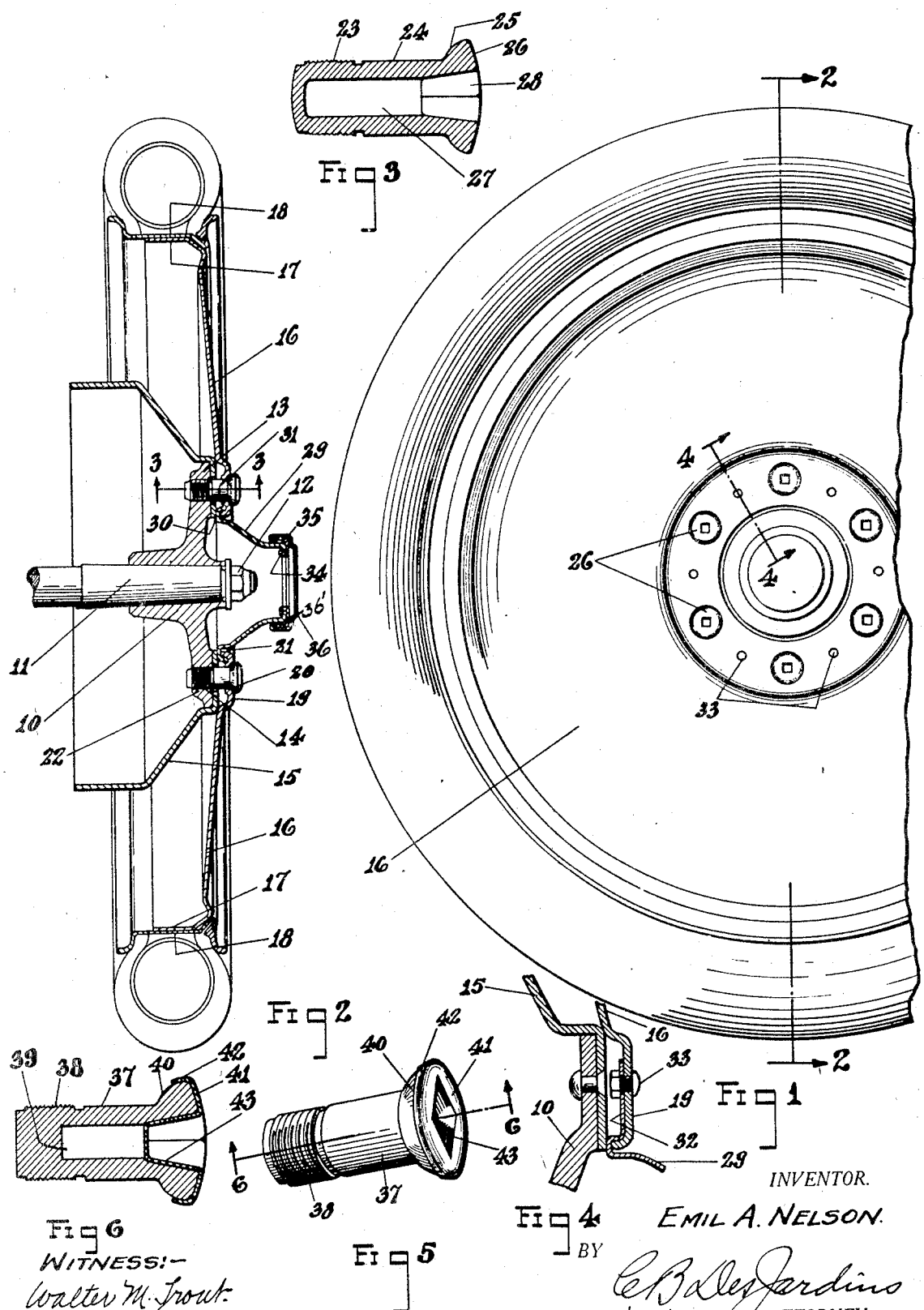
INVENTOR.
EMIL A. NELSON.
BY
C. B. desJardins
ATTORNEY.
WITNESS:—
Walter M. Trout.

Patented Oct. 25, 1927.

1,646,867

UNITED STATES PATENT OFFICE.

EMIL A. NELSON, OF ABINGTON, PENNSYLVANIA, ASSIGNOR TO BUDD WHEEL COMPANY, OF PHILADELPHIA, PENNSYLVANIA, A CORPORATION OF PENNSYLVANIA.

VEHICLE WHEEL.

Application filed December 6, 1923. Serial No. 678,795.

My invention relates to improvements in vehicle wheels and has to do, more particularly, with the construction of demountable, disc wheels for automobiles.

My invention relates, more particularly, to demountable disc wheels of the type in which the demountable disc, forming the body of the wheel, is detachably fastened to a hub, and the principal object of my invention is to provide improved means for fastening the detachable wheel body to the hub, which means will lie substantially flush with the surface of said wheel body.

A further object of my invention is to provide a vehicle wheel having a demountable wheel body and provided with very simple means for fastening said wheel body to the hub, which can be manufactured at a low cost.

A further object of my invention is to provide an improved wheel construction in which the weight of the wheel is reduced and the hub structure is simplified very materially.

Another object of my invention is to provide a wheel construction having a false hub which may be very light in weight and may be carried by the demountable disc or wheel body, so that, when the wheel body is removed, the nut which holds the hub on the axle is immediately exposed.

Another object of my invention is to provide an improved and simplified wheel construction which is light in weight and can be manufactured at a low cost, but which is, nevertheless, very strong and durable in construction.

Further objects, and objects relating to details and economies of construction and operation will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawing, forming a part of this specification, in which Fig. 1 is a fragmentary plan view of a wheel embodying my invention.

Fig. 2 is a vertical, sectional view through said wheel, taken on the line 2—2 of Fig. 1.

Fig. 3 is a detail, sectional view through one of the retaining screws, taken on the line 3—3 of Fig. 2.

Fig. 4 is a detail, sectional view, taken on the line 4—4 of Fig. 1.

Fig. 5 is a perspective view of a modified form of retaining screw, and

Fig. 6 is a sectional view, taken on the line 6—6 of Fig. 5.

In the drawing, the same reference numerals refer to the same parts throughout the several views, and the sectional views are taken looking in the direction of the arrows at the ends of the section lines.

In general, I accomplish the objects of my invention by providing a wheel construction including a wheel body, which may be a disc and on which is mounted the tire-carrying rim, said wheel body being detachably mounted on the hub by means of a plurality of retaining screws, which screw into the hub and engage the wheel body, and which are so fashioned that their heads are substantially flush with the surface of said body. I propose to provide the disc, which may constitute the body of the wheel, with perforated concave seats, adjacent the central opening in said disc, and to provide the retaining screws with convex heads which seat in said concave seats. These screws are preferably provided with non-circular openings, or sockets, adapted to receive the end of a wrench or suitable tool, by means of which the retaining screws can be turned and screwed into the hub to fasten the disc in place. Heretofore, it has been customary to provide, in a wheel construction of this sort, a comparatively large hub which extends through a central opening in the disc and carries a hub cap bearing the name plate or other decoration. This outwardly-projecting part of the hub adds considerably to the weight and cost of the hub, and it does not add materially to its strength. I propose to simplify the construction of the hub and reduce its weight by providing a false hub which is secured to the disc and demountable from the hub with said disc. This false hub covers the central opening in the wheel body and projects laterally therefrom so as to simulate the projecting hub of prior construction, and it may carry the hub cap with the name plate or other decoration. This false hub may be made of pressed metal, and, hence, it reduces the weight of the wheel and its cost of construction.

Referring to the numbered parts of the drawing, I have illustrated my invention as embodied in a wheel comprising a hub, 10, which, in Fig. 2, I have shown as mounted on a driven shaft, 11, and held in place thereon by the nut, 12. Of course, in the case of a front wheel, the hub will be mounted on the fixed spindle by means of bearings in accordance with the usual practice. The hub, 10, is provided with a flange, 13, having a substantially plane annular seat and an undercut portion between said seat and the hub proper. A series of threaded holes, 14, are provided in said flange to receive the retaining screws. A brake drum, 15, may be secured to the flange, 13, of said hub, in any suitable manner, but preferably by having its inner peripheral portion seated against the annular seat of said flange. The body of the wheel is made up of the disc, 16, having its periphery flanged, at 17, and on which is mounted the tire-carrying rim, 18, in accordance with the usual practice. The disc, 16, is provided with a central opening therein and an outwardly extending rib, 19, is formed in said disc, adjacent said central opening. It will be observed that the bend forming the outer edge of said annular rib, contacts with the brake drum at the periphery of the flange, 13, of said hub. The inner edge of said rib is formed by an inturned flange, 21, which is cylindrical and coaxial with the wheel. In the rib, 19, there are formed a series (in this instance, six) of concave seats 20, which are perforated to permit of the passage therethrough of the retaining screws. The wheel is demountably fastened to the hub, 10, by means of the retaining screws, 22. One of these screws is shown, more clearly, in section in Fig. 3, and it comprises the cylindrical body portion, 24, one end of which is externally threaded, at 23, and screws into one of the internally-threaded holes, 14, in the flange, 13. The head of the screw is provided with a convex surface, 25, which fits the concave seats, 20, in the rib, 19, of the disc and lies substantially flush with the outer surface of said rib. The outer end surface of the screw may be curved slightly, at 26, to present a pleasing contour and appearance. These retaining screws, 22, are hollow, having a hollow interior, 27, which serves no function except to lessen the weight, and having a flared opening 28, which is non-circular in cross-section, so as to receive the non-circular end of a wrench, or other tool, by means of which the retaining screw may be rotated.

A false hub, 29, is secured to the disc, adjacent the central opening therein, and projects through said central opening in such a manner as to simulate the usual projecting end of a hub. The larger end of this cup-shaped false hub, 29, is flanged radially, at 30, and, thence, outwardly, at 31, around the flange, 21, at the inner edge of the central opening in the disc, 16. Portions of said false hub project along the inner side of the rib, 19, as at 32, and said false hub is screwed in place by the bolts, or rivets, 33, extending through the rib, 19, and through said portions, 32. The false hub, 29, projects through said central opening and tapers slightly, becoming smaller in diameter, and is provided with an inturned, annular flange, 34, at its smaller end. The hub cap, 36, which is adapted to carry the name plate, or other decoration, is slipped over the end of said false hub, 29, being flanged around it, as at 35, and is secured in place by the retaining member, 36', around one angle of which the hub cap is flanged, while the other angle of said retaining member is flanged around the portion, 34, of the false hub. It will be observed that this false hub, 29, may be stamped or drawn from sheet metal, and will be comparatively light in weight, and very cheap to manufacture. This reduces the weight of the hub considerably and also reduces the cost of making the wheel.

In Figs. 5 and 6, I have shown a modified form of retaining screw for fastening the wheel body upon the hub. In this form of my construction, the body of the screw is formed of a section of tubing having a cylindrical portion, 37, and an externally-threaded portion, 38. The outer end of this section is flanged outwardly, forming the head, 40, which has a convex surface to fit the concave seats, 20, in the rib of the disc, and the outer end of which is curved slightly, as indicated with respect to the screw shown in Fig. 3. The corresponding end of the bore, 39, of said tubular section, is widened out somewhat, and receives the socket portion, 43, of a stamped metal cap, 41, which fits over the head of the screw, and has a flange, 42, flanged around the edge of said head. The socket portion, 43, of said metal cap, is non-circular in cross-section so as to receive the non-circular end of a wrench, or other tool, for rotating the retaining screw. The metal cap, 43, may be made of German silver, or similar metal, which will take a polish, and it may be very easily and quickly slipped on and fastened in place on the head of the retaining screw. This makes a type of retaining screw which can be produced at a very small cost, but which gives a very fine appearance to the wheel.

It will be observed that the demountable disc, 16, is fastened to the hub by the screws, 22, which are screwed into the threaded openings, 14, of the hub flange. These screws may be removed, in order to remove the disc, by inserting a tool into the socket, 28, of each screw, and rotating it, in the usual manner. It will be observed that the heads of these fastening screws are substantially flush with the rib portion, 19, of the disc, so that they do not present any unsightly obstruction which detracts from the appearance of the wheel. It will also be observed that the fastening screws 22 provide means whereby the brake drum, demountable disc and the false hub are commonly secured to the hub flange. The form of retaining screw shown in Figs. 5 and 6 is substantially the same as that shown in Fig. 3, and works in substantially the same manner. In the latter form, however, the addition of a cap of highly polished metal makes a better looking article which can, nevertheless, be produced at a low cost. It will also be observed that I have greatly reduced the size of the hub, and the amount of metal in the hub, by providing the false hub, 29, which is carried by the disc and removable with it. It will be observed that this is a stamping which can be produced at a low cost and readily fastened in place on the disc. It will also be observed that, as soon as the disc is removed from the hub, the nut which fastens the hub to the axle is exposed so that the hub can be removed quickly and easily, or access can be had to the bearings for greasing or adjusting.

I am aware that the particular embodiment of my invention, which has been described in this specification and illustrated in the accompanying drawing, may be changed considerably without departing from the spirit of my invention, and, therefore, I claim my invention broadly, as indicated by the appended claims.

Having thus described my invention, what I claim as new and useful and desire to secure by Letters Patent is:

1. In a wheel, the combination of a hub, having a plurality of threaded openings therein, a disc detachably secured to said hub, and having a central opening and a plurality of perforated, concave seats adjacent said central opening, and a plurality of retaining screws passing through said perforated, concave seats and screwing into the threaded openings of said hub, said screws having heads with convex surfaces fitting said seats and sockets of non-circular cross-section adapted to receive a wrench.

2. A wheel comprising a hub, having a plurality of internally-threaded openings, a disc detachably secured to said hub, and having a central opening and a plurality of perforated, concave seats, surrounding the central opening, and a plurality of hollow, retaining screws, each having a cylindrical shank, with one end externally threaded to screw into one of the openings in said hub, and the other end formed into a head having a convex surface engaging one of the concave seats in the disc, the entrance to said hollow screw being non-circular in cross-section to receive a wrench.

3. In a wheel, the combination of a hub having a radial flange, a false hub likewise having a radial flange, a demountable wheel disc having a central opening formed therein thru which said false hub projects, and means extending thru said disc and into the hub flange for securing said disc to said hub flange with the false hub flange lying therebetween.

4. In a wheel, the combination of a hub having a radial flange, said flange being undercut on the outside face in a zone adjacent the hub proper and having, radially beyond said undercut portion, a substantially plane annular surface, a brake drum, demountable disc and false hub, and means for commonly securing said brake drum, disc and false hub to said surface.

5. In a wheel, the combination of a hub having a radial flange, provided with a substantially plane annular surface, a brake drum, demountable disc and false hub, and axially extending elements for commonly securing said brake drum, demountable disc and false hub to said surface.

6. A wheel comprising a hub, a disc detachably secured to said hub, said disc having a central opening therein and an inturned flange surrounding said central opening and a pressed metal false hub disposed in said opening, flanged around said flange of the disc and secured to said disc, said false hub concealing the end of the hub proper.

7. A wheel comprising a hub, a wheel disc detachably secured to said hub and having a central opening therein and an inturned flange at the edge of said central opening, a pressed metal member forming a false hub and projecting through said central opening and having a portion flanged around the flange and secured to said disc, and a hub cap carried by the outer end of said false hub.

8. A wheel comprising a hub, a wheel disc detachably secured to said hub and having a central opening therein, a cup-shaped pressed metal member forming a false hub and projecting through said central opening and having a portion secured to said disc, and a hub cap carried by the end of said false hub.

9. A wheel comprising a hub having a plurality of internally-threaded openings therein, a wheel disc having a plurality of openings therein arranged at equal distances from the axis of the disc, and a central opening, retaining screws extending through the openings in the disc and screwed into said openings in the hub, and a cup-shaped sheet metal member forming a false hub and secured to said disc and projecting through said central opening.

10. A wheel comprising a hub, having a flange provided with a plurality of internally-threaded openings arranged at equal distances from the axis, a demountable wheel disc having a central opening, and a plurality of openings arranged at equal distances from the center of the disc around said central openings, said last-named openings being formed in concave seats, a plurality of retaining screws having heads seating in said concave seats and screwed into the openings in said hub flange, and a sheet metal member constituting a false hub projecting through said central opening and secured to said disc adjacent said central opening.

In testimony whereof, I affix my signature.

EMIL A. NELSON.